(12) United States Patent
Laurell

(10) Patent No.: US 6,259,711 B1
(45) Date of Patent: Jul. 10, 2001

(54) LASER

(75) Inventor: Fredrik Laurell, Danderyd (SE)

(73) Assignee: Cobolt AB, Saltsjo-Boo (SE)

( * ) Notice: Subject to any disclaimer, the term of this patent is extended or adjusted under 35 U.S.C. 154(b) by 0 days.

(21) Appl. No.: 09/242,892

(22) PCT Filed: Sep. 2, 1997

(86) PCT No.: PCT/SE97/01466

§ 371 Date: Feb. 24, 1999

§ 102(e) Date: Feb. 24, 1999

(87) PCT Pub. No.: WO98/10497

PCT Pub. Date: Mar. 12, 1998

(30) Foreign Application Priority Data

Sep. 5, 1996 (SE) .................................................. 9603234

(51) Int. Cl.[7] .................................................... H01S 3/10
(52) U.S. Cl. ..................... 372/22; 372/102; 372/98; 372/27; 372/21; 372/9
(58) Field of Search ................................. 372/22, 27, 21, 372/9, 102, 98, 75

(56) References Cited

U.S. PATENT DOCUMENTS

| | | |
|---|---|---|
| 4,723,257 | 2/1988 | Baer et al. . |
| 4,847,851 | 7/1989 | Dixon . |
| 4,953,166 * | 8/1990 | Mooradian .......................... 372/21 |
| 4,982,405 | 1/1991 | Zayhowski et al. . |
| 5,119,382 | 6/1992 | Kennedy et al. . |
| 5,132,977 | 7/1992 | Zayhowski et al. . |
| 5,187,714 | 2/1993 | Okazaki et al. . |
| 5,256,164 * | 10/1993 | Mooradian .......................... 372/32 |
| 5,265,116 * | 11/1993 | Mooradian .......................... 372/92 |
| 5,289,491 * | 2/1994 | Dixon .................................... 372/92 |
| 5,315,433 | 5/1994 | Okazaki et al. . |
| 5,341,393 | 8/1994 | Okazaki et al. . |
| 5,343,485 | 8/1994 | Okazaki . |
| 5,388,114 * | 2/1995 | Zarrabi et al. ........................ 372/22 |
| 5,425,039 * | 6/1995 | Hsu et al. ............................. 372/75 |
| 5,511,085 * | 4/1996 | Marshall .............................. 372/22 |
| 5,574,740 * | 11/1996 | Hargis et al. ........................ 372/22 |
| 5,585,962 | 12/1996 | Dixon . |
| 5,651,023 * | 7/1997 | MacKinnon ......................... 372/22 |
| 5,754,333 * | 5/1998 | Fulbert et al. ....................... 372/21 |
| 5,832,010 * | 11/1998 | Fulbert et al. ....................... 372/22 |
| 5,933,444 * | 8/1999 | Molva et al. ......................... 372/75 |
| 5,982,789 * | 11/1999 | Marshall et al. .................... 372/22 |

FOREIGN PATENT DOCUMENTS

| | | |
|---|---|---|
| 0571051A1 | 11/1993 | (EP) . |
| 2266988A | 11/1993 | (GB) . |
| WO90/09688 | 8/1990 | (WO) . |
| WO95/06345 | 3/1995 | (WO) . |
| WO96/18132 | 6/1996 | (WO) . |
| WO96/36095 | 11/1996 | (WO) . |

OTHER PUBLICATIONS

"Intracavity second harmonic generation of 0.532 μm in bulk periodically poled lithium niobate" by V. Pruneri et al., *Optics Communications*, vol. 116, Apr. 15, 1995, pp. 159–162.

"Microchip Lasers and Laser Arrays: Technology and Applications", Aram Mooradian et al., *Optics and Photonics News* (Nov. 1995) pp. 16–19.

* cited by examiner

*Primary Examiner*—Leon Scott, Jr.
(74) *Attorney, Agent, or Firm*—Burns, Doane, Swecker & Mathis, L.L.P.

(57) ABSTRACT

The invention refers to a laser having first and second reflecting elements (3, 4) defining a laser cavity; a laser microchip (1) provided in the laser cavity to generate laser radiation of a fundamental wavelength; and a quasi-phase matching non-linear optical element (2) provided in the laser cavity to receive said laser radiation of the fundamental wavelength from the laser microchip (1) and to emit frequency doubled laser radiation (SH) of a wavelength half as long as the fundamental wavelength.

31 Claims, 5 Drawing Sheets

LASER

TECHNICAL FIELD OF INVENTION

The present invention refers to a method for generating laser radiation, comprising the steps of generating laser radiation of a fundamental wavelength from a laser microchip in a laser cavity by pumping it with radiation from a diode laser.

The present invention also refers to a laser comprising: first and second reflecting elements defining a laser cavity; and a laser microchip provided in said laser cavity and arranged to be pumped by radiation from a diode laser to thereby generate laser radiation of a fundamental wavelength.

BACKGROUND AND PRIOR ART

Microchip lasers and miniature lasers that uses laser microchip's are small, robust, compact, diode pumped solid state lasers which can be manufactured in large quantities at a low cost. For a general technology background and examples on aspects, advantages and interesting application areas of microchip lasers reference is given to the article "Microchip Lasers and Laser Arrays: Technology and Applications", Optics and Photonics News, November 1995, pp. 16–19. Examples on interesting application areas for microchip lasers include transmission of cable TV signals, image generation, material treatment, etc.

The microchip laser concept was developed at MIT Lincoln Laboratory in the middle of the 1980s and aims to use semiconductor packaging and fabrication technology for manufacturing of lasers. Simple microchip lasers are made form a rod of laser material, normally a crystal or a glass, such as Nd:YAG. The rod is cut into wafers which are polished to show planar and parallel surfaces which is then coated with dielectric mirrors, usually by some kind of vacuum deposition technology. The wafers are then cut into chips using conventional semiconductor cutting technology. Laser crystal chips usually have an area of approximately 1×1 to 4×4 mm$^2$ and a thickness in the radiation direction of less than 4 mm. The microchip laser technology thus provides for mass production of laser microchips. For example, more than 2,000 chips can be fabricated from a 1 inch long Nd:YAG rod.

Furthermore, different types of functional elements, such as Q-switches or frequency doubling elements etc., can be integrated in the laser cavity. By using pick and place technology, the laser chip and one or more functional elements may be brought together and contacted through thermal diffusion bonding or similar. When the different elements are mounted together in this way, and mirrors are applied directly on the chips/elements, the appearance of air gaps is eliminated in the laser cavity, which eliminates risk for reflections which may disturb the lasing. However, laser microchips can also be used in so called miniature lasers, in which the laser microchip and other incorporated functional elements not necessarily are arranged in contact with each other but instead are separated from each other by small gaps.

Just as for conventional solid state lasers, the laser material is doped with ions of a rare earth metal that provides the lasing. As the thickness of the laser chip is small compared to other types of solid state lasers, the laser radiation can only be built up over a relatively short distance. To compensate for this limitation, the laser microchip material is given a high degree of dopant as compared to other solid state lasers. In a micro-hip laser, the doping provides for more than 0.1 percent by weight of the laser material, while the degree of dopant in a conventional solid states laser usually is far below 1,000 ppm, for example 50 ppm for a 10 cm long laser crystal. The high degree of dopant in the laser microchip provides a short absorption length, which among other things makes it possible to store a large amount of energy in a small volume, but also leads to a shorter lifetime for electrons excited to the meta- stable upper laser level.

The most common and important dopant for laser microchips is neodymium (Nd), but erbium (Er), prasodymium (Pr), holmium (Ho), and ytterbium (Yb) are other examples on important rare earth metals that can be used as dopants. Ytterbium is of special interest, as it can ease over a broad spectrum or wavelengths.

Several different host materials may be used. YAG—Yttrium Aluminium Garnet ($Y_3Al_5 O_{12}$) and yttrium vanadate ($YVO_4$) are two of the most commonly used crystals today. YAG has a comparatively long lifetime for the meta-stable state, but a lower absorption cross-section (i.e. a lower absorption capacity) than yttrium vanadate, which enables the latter to be made shorter. Many other crystals may be used, such as YLF (yttrium-lithium-flouride), LNP, LSB, SVAP, and $GdVO_4$ (gadolinium vanadate). Even glasses and plastics can be used as host materials.

Most Nd lasers are used at the strong transition $^4F_{3/2} \rightarrow {}^4I_{11/2}$. This provides lasing at wavelengths slightly longer than 1 μm, somewhat varying as dependent on the host material. For Nd:YAG this wavelength usually appears at 1064 nm. Other interesting transitions that may be used are $^4F_{3/2} \rightarrow {}^4I_{9/2}$, which gives lasing at shorter wavelengths (946 nm for Nd:YAG), and $^4F_{3/2} \rightarrow {}^4I_{13/2}$, which gives lasing at a longer wavelength (1360 nm for Nd:YAG).

The laser microchip is usually pumped by a diode laser that gives a wavelength snatched to the absorption band of the used rare earth metal. The pumped laser may be single mode or multimode. The function of the diode laser is only to excite electrons in a small volume of the laser microchip and thereby transfer the largest possible amount of energy to the mode of the laser micro-chip. A relatively cheap diode laser is thus preferably used, as the laser microchip will transfer the relatively poor spectral and spatial properties of the diode laser output into a laser beam having pure spectral and spatial properties and low noise. As a result of the high doping and short length of the laser microchip (and the corresponding short laser cavity which gives a large mode spacing), microchip lasers are characterized by a tendency to lase in single mode, which is desired in many applications.

A very important property of materials such as YAG is that dn/dT (the change in refractive index with temperature) is positive, which means that a thermally induced lens is created by the heat generated by that part of the pump energy which is not utilized for the lasing in the microchip laser. The thermal expansion of the material also contributes to the creation of this lens. The lens stabilizes the laser cavity, which would otherwise have been an unstable (coplanar) cavity. For a chip having plane, parallel mirror surfaces, a stable resonator may be formed if the pump light is concentrated This phenomenon gives an automatically stabilized resonator, which enables simple manufacturing and alignment.

A very important type of microchip lasers and miniature lasers Which utilize laser micro chips are such that 25 uses so celled intra-cavity frequency doubling. These types of lasers comprise an intra-cavity arranged functional element in the form of a frequency doubling crystal that provides frequency doubling (SHG—second harmonic generation) of the fundamental light wave, i.e. which converts the laser radiation of the fundamental wavelength from the laser microchip into laser radiation of half the fundamental wavelength. Examples on such intra-cavity frequency doubling in a microchip laser has been described in the international patent application WO 90/09688.

Intra-cavity frequency doubled microchip lasers can show a very high conversion efficiency even at low pump power. This is caused by the laser mode being concentrated i.e. has a high intensity, in the short microchip laser cavity, and by the laser mirrors being made high reflecting at the laser wavelength, which means that the fundamental light wave is confined between the mirrors to build up a high intensity.

During frequency doubling, two coherent photons at the fundamental wavelength, each having the energy $\hbar\omega$ induce a polarization at the double frequency in the non-linear material. The induced polarization is a source term for emission of a new photon having the energy $2\hbar\omega$. To achieved an efficient frequency doubling, phase matching is required, which means that the polarization induced at different places in the material emit frequency doubled radiation coherently. This require that the two waves $\omega$ and $2\omega$ perceive the same refractive indices. This is normally not possible, as the dispersion makes the refractive index at the shorter wavelength larger than the refractive index at the longer wavelength.

When using intra-cavity frequency doubling in microchip lasers, so-called birefringent phase matching is utilized. Here, a difference in refractive index for different polarization's in uniaxial and biaxial non-linear crystals is utilized. The difference in refractive index makes it possible to achieve the desired phase matching.

Birefringent phase matching is used since birefringent crystal chips may be mass produced in a similar way as the laser chips mentioned above. For example, a KTP crystal rod can be cut into wafers along those planes that are required to provide a crystal having the necessary double refraction for birefringent phase matching in different directions. These wafers can then be cut into chips that can be bonded to the laser chips by pick and place technology, as discussed above.

OBJECTS OF THE INVENTION

Even if microchip lasers with double refractive intra-cavity frequency doubling seems to show great potential when it comes to desired mass production advantages, they also carry several inherent disadvantages.

One disadvantage is that for each nonlinear material only a restricted wavelength region, determined by the specific refractive indices of the material, can be used for phase matching. The possibilities to choose frequency to be doubled is hence severely restricted.

Another disadvantage is that the polarization of the light is rotated when the light is propagating through a birefringent crystal. This means that light that has propagated one round-trip through the cavity does not have the same state of polarization as it had when it started. This means that the length of the crystal has to be controlled very accurately to avoid such stochastic variations, which otherwise would have severe effect on the frequency doubled output. Each separate crystal has to be polished to an exact length. Further problems occur when the temperature changes, as the refractive indices and thereby the optical path length changes with temperature which will lead to the fluctuation in the state of polarization. For example, a stable operation for a temperature interval of 10 to 70° C. would be very hard to achieve.

To the best knowledge of the inventors, this problem has not been solved yet, which has impeded the realization of temperature stable frequency doubled microchip lasers.

An object of the invention is thus to realize frequency doubling in a laser having a laser microchip in such away that the laser shows a stable state of polarization, a high efficiency and can be fabricated at a low price.

SUMMARY OF THE INVENTION

According to the invention, above mentioned and other aspects are achieved by a method and a device as defined in the accompanying claims.

According to a first aspect of the invention, there is provided a method of the kind mentioned in the introduction, characterized by the step of converting said laser radiation of said fundamental wavelength, by means of intra-cavity quasi-phase matching in said laser cavity, into frequency doubled radiation having a wavelength being half as long as the fundamental wavelength.

According to a second aspect of the invention, there is correspondingly provided a laser of the kind mentioned in the introduction, characterized by an optical non-linear, quasi-phase matching element provided in the laser cavity to receive said laser radiation of the fundamental wavelength from said laser microchip and to emit frequency doubled laser radiation of a wavelength being half as long as said fundamental wavelength.

Hence, according to the invention frequency doubling is achieved in connection with the use of a laser micro chip by so called quasi-phase matching. Quasi-phase matching is achieved in the quasi-phase matching element according to the following: When a first light wave at the angular frequency $2\omega$, that has been generated at a first point in time at the position x=0, reaches the position $x=1_c$ at a second point in time, at which the first light wave is 180° out of phase with the second light wave generated at the position $x=1_c$ at the second point in time, the nonlinearity is inverted over a second region (from $x=1_c$ to $x=21_c$), which means that light generated in this second region is phase shifted 180 degrees relative to light generated in the first region (x=0 to $x=1_c$). The distance $1_c$ is usually called the coherence length. In such a way, light generated in the second region will be in phase with the light generated over the first region. After the next coherence length, the nonlinearity is inverted again. The nonlinearity is in this way modulated periodically throughout the material.

Quasi-phase matching has several advantages. For example, any wavelength can be phase matched throughout the transparency region of the nonlinear medium by proper choice of the periodic modulation of the nonlinearity. Furthermore, a single polarization can be used, and it is thus no longer necessary to rely on birefringent crystals to get the desired phase matching. Furthermore, for many materials, the largest nonlinearty cannot be used for birefringent phase matching, but it can be used for quasi-phase matching. Theoretically, the efficiency in the frequency doubling process may be improved by a factor of ten or more for quasi-phase matching over conventional birefringent phase matching. using quasi-phase matching, it is also relatively easy to achieve phase matching at shorter wavelengths. An interesting application is to use one single material and quasi-phase match the three laser lines for the Nd:YAG laser to blue, green and red light, which not would have been possible with conventional birefringent phase matching. Small compact lasers at these wavelength are very interesting for many applications, particularly image formation and displays.

According to a preferred embodiment of a laser according to the second aspect of this invention, the quasi-phase matching element consist of an optically nonlinear crystal whose c-axis is directed perpendicular to the propagation direction through the element. This is called noncritical phase matching and means that the fundamental wavelength beam and the frequency doubled wavelength beam are aligned. This carry a great advantage since the beam quality is preserved. In conventional birefringent phase matching, "walk-off" effects typically appear, i.e. the frequency doubled wave is propagating in a different direction than the fundamental which results in an undesired elliptical beam. Furthermore, the conversion efficiency is proportional to the interaction length, which means that it is important to have the two waves to propagate overlapping the longest possible distance to get a maximum energy transferred to the frequency doubled wave.

According to a preferred alternative, said optically nonlinear crystal is made of $LiNbO_3$, $LiTaO_3$, $KTiOPO_4$, $RbTiOPO_4$, $RbTiAsO_4$, $CsTiOAsO_4$, or $KTiOAsO_4$. $KTiOPO_4$ (KTP) is the presently most commonly used material and can hence be obtained in good quality and at a low price. In the nonlinear crystals, the polarization axis is inverted periodically. This is called ferroelectric domain inversion Example on ways of achieving domain reversal in ferroelectric crystals are by diffusion at high temperatures, ion-exchange and poling with electric fields. As mentioned above, the period should be chosen to compensate for phase velocity mismatch between the fundamental and the frequency doubled wave.

According to another preferred embodiment of the invention a light converging element provided to converge said laser radiation of the first wavelength so that the light intensity, with respect to said laser radiation of the first wavelength, becomes as large as possible in said quasi-phase matching element. According to this embodiment the light intensity in the quasi-phase matching element is increased, and as the conversion efficiency is increasing with increasing intensity, an increase in the output power, at the frequency doubled wavelength, is obtained from the quasi-phase matching element.

According to a preferred embodiment converging is obtained by said first reflecting element having a both inward directed and curved reflecting surface, with respect to said laser cavity, forming said light converging element. In this context, the laser microchip is preferentially provided to have a correspondingly curved surface on which said reflecting element, forming the light converging element, is provided. This gives a very compact construction with high intensity in the quasi-phase matching element.

Another very important property of quasi-phase matching crystals is that only one polarization is utilized. Polarization induced noise may therefore be eliminated. In isotropic materials, or materials where the probability for lasing for the two orthogonal polarization states are relatively similar, a polarizer may be placed in the cavity to achieve linearly polarized laser emission and thereby eliminate polarization instabilities.

According to another preferred embodiment of a laser according to the invention, a polarization discriminating element is provided in the laser cavity.

In cases where one wants to generate short pulses with high power, it may be desired to place an active or a passive pulsing element in the laser cavity. In a preferred embodiment, said pulsing element is a passive Q-switch consisting of a saturable absorber preferably made in a Cr-doped crystal or a Cr-doped glass.

It is often preferred that the laser microchip generates a stable single-mode at a wavelength falling within the phase matching bandwidth of the quasi-phase matching element. A short cavity, which is the consequence of a short microchip laser, normally gives single mode lasing, but the occurrence of an undesired multi-mode lasing can be eliminated by providing a mode discriminating element, which only allows lasing in desired modes, in the cavity.

It can also be mentioned that in many applications it is important to be able to pulse the laser light, which for example may be done by providing a functional element that temporarily inhibits lasing in the cavity, a so called "Q-switch" or a mode-locker. When the pulsing element then allows lasing, all the energy stored in the laser microchip since last pulse will be released in one energetic pulse. This gives a short pulse with high peak power. Q-switching can be done both passively and actively. Passive Q-switching is achieved with a saturable absorber. For passive Q-switching of Nd:YAG microchip lasers for 1064 nm, good results have been obtained with a thin crystals of Cr:YAG. For active Q-switching, so called Pockel cells are utilized. This could for example be a crystal of KTP, $LiNbO_3$ or $LiTaO_3$ which is modulated by a voltage applied over electrodes applied on the surfaces of the crystal. Active control gives larger freedom in the design of the laser as well as for the temporal noise in the emission of pulses.

It is from a manufacturing perspective today preferred to provide the energy to the laser element optically from a laser diode via an optical fiber. This gives a simple coupling which can be optimized during mounting and which permits the laser diode to be place at a distance away from the laser element.

Another preferred way to transfer the energy from the diode laser to the laser element is to use a holographic optical element.

Another preferred alternative is to transfer the energy from the laser diode to the laser element via a GRIN lens (graded index lens). GRIN lenses in the form of rods, which can be made of different length and thereby adjusted to specific applications, are very practical for use with diode lasers.

According to very preferably embodiment of the invention, said elements of different kinds are aligned to form an essentially straight beam path through the laser cavity. This makes it possible to form a very short laser. Furthermore, a straight coinciding beam path will provide a higher efficiency in the transfer of energy from the fundamental wave to the frequency doubled wave, as discussed above. Hence it is preferred that the beam path essentially follows a straight line between the reflectors and that the planar surfaces of the different elements are arranged perpendicular to the beam path, i.e. the arrangement forms a so called planar cavity. However, a more or less folded beam path may also be an alternative for miniature lasers using microchips.

Furthermore, both of the reflecting elements are provided to transmit said frequency doubled radiation out from the laser cavity. If only one of the reflecting elements transmits the frequency doubled radiation and the other reflecting element reflects the frequency doubled radiation, destructive interference might occur.

According to yet another embodiment of the invention the laser microchip consists of a material containing more than 0.1 weight percent of the laser dopant. The high degree of dopant is compensating the relatively short optical path length of the laser microchip. For example, it is desired that said laser microchip has a length in the optical path direction of less than 3 mm, preferably less than 1.5 mm.

For many applications, it is furthermore preferred that the dopant is neodymium or ytterbium and the host material is YAG or YVO$_4$.

To create a cavity being as short as possible, in order to get as close to single-mode operation as possible, it said quasi-phase matching element preferably has a length in the beam path direction of less than 4 mm, preferably less than 2 mm.

To give the microchip laser a generally compact construction, it is desired that the cross-section area of the quasi-phase matching element is smaller than 10 mm$^2$ perpendicular to the beam propagation direction, preferably smaller than 5 mm$^2$.

To avoid undesired internal reflections in the cavity and to provide an embodiment being as compact as possible, is it preferred that the elements are arranged in contact with each other to form a cavity without any air gaps which might cause reflections.

From a manufacturing perspective it is furthermore preferred that the laser microchip and the quasi-phase matching element are mounted together by thermal diffusion and that the reflecting element is applied on the outside of the laser microchip and the quasi-phase matching element, respectively, by vacuum evaporation. A simpler technique for mounting, which can be applicable in some cases, is to simply glue two or more elements together.

According to yet another embodiment of the present invention, which may prove interesting in the future, one or more of said elements are provided on a carrier where they form the miniature or microchip laser. It is furthermore understood that fine adjustments of the elements with respect to each other is possible if they are provided separate from each other on the carrier. If they are mounted separately, internal reflection may be avoided by coating the individual components with anti-reflection coatings.

In another embodiment of the invention, the quasi-phase matching element comprises several quasi-phase matching gratings provided in parallel with slightly different grating periods.

The advantage with such an element is that the refractive index of the non-linear element not always are exactly known. To then guarantee that the quasi-phase matching condition is fulfilled, the element may be provided with slightly different grating periods in different parts of the element. When manufacturing the microchip, coupling of the diode laser light may be optimized so that the frequency doubling takes place at a grating period giving the highest frequency doubling efficiency.

A crystal having different grating periods can also be made by forming the periodic domain inversions of the crystal in a fan-like diverging form, as will l be described below.

It should also be mentioned that the pumping of the laser microchip can be achieved in several ways. The pumping diode laser can be provided close to the laser micro-chip, whereby the pumping is provided directly from the diode laser to the laser microchip. This construction gives a very compact device, but unfortunately the risk of causing damage on the optical surfaces during construction of the laser, as the diode laser has to be provided only a few micrometers away from the laser microchip. Another method is to transfer the laser light from the diode laser to the laser microchip through an optical fiber. This method shows the advantages that the diode laser can be cooled independently of the microchip, as it can be placed away from the chip, that a large amount of light is provided to the laser microchip, as the fiber makes sure that the divergence of light from the diode laser is limited, and that the coupling of light to the laser microchip can be adjusted during production for optimizing thereof, which facilitates mass production. According to another example, the optical fiber coupling is replaced by one or several lenses, or other types of optics, which however can be less desired for mass production as this usually requires extensive adjustments and optimizations.

BRIEF DESCRIPTION OF THE DRAWINGS

Further aspects and advantages of the present invention will become clear from the following detailed description with reference to the accompanying drawings, wherein.

DETAILED DESCRIPTION OF PREFERRED EMBODIMENTS

Figure 1:
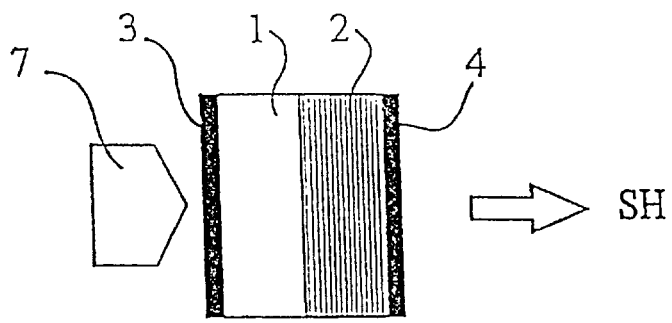
FIG. 1 schematically shows a laser according to a first embodiment of the invention.

In FIG. 1, a microchip laser is shown according to a first embodiment of the invention. In this specific example, the microchip laser comprises an approximately 1 mm long laser microchip 1 which is made of a solid-state laser of ND:YAG. The laser microchip 1 is pumped with optical energy from a diode laser 7 and emits a fundamental wavelength. Furthermore, an approximately 1 mm long optically nonlinear crystal 2 of KTP is arranged in contact with the laser microchip 1. The elements 1 and 2 are mounted together by diffusion bonding and reflecting element 3 and 4 are provided on the end surfaces of the elements 1 and 2 to form an approximately 2 mm long laser cavity which consequently comprises both the laser chip 1 and the quasi-phase matching crystal 2.

The optical nonlinear crystal 2 comprises a quasi-phase matching grating with a quasi-phase matching bandwidth matched to the fundamental laser wavelength from the laser chip 1. The c-axes of the crystal is directed perpendicularly to the beam path through the crystal, i.e. perpendicularly to direction of the arrow SH. The crystal 2 receives the fundamental light wave from the laser chip 1 and transform it into a frequency doubled light wave SH.

The reflecting elements 3 and 4 reflect essentially all the fundamental radiation and transmits as much as possible of the frequency doubled light.

Figure 2:
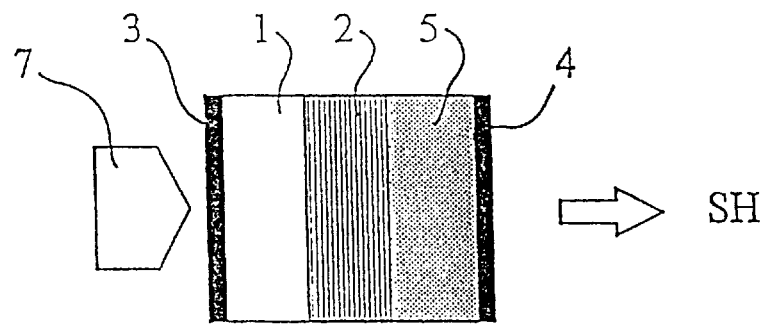
FIG. 2 schematically shows a laser according to a second embodiment of the invention.

In FIG. 2, a frequency doubled microchip laser according to a second embodiment of the invention is shown, which, in addition to the elements described above, also comprises an intra-cavity arranged Functional element in form of a Q-switch 5 provided to transmit the frequency doubled light in short pulses with high peak power.

Figure 3:
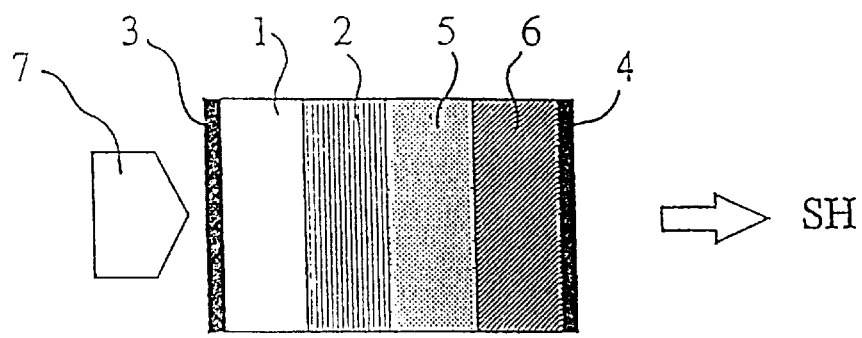
FIG. 3 schematically shows a laser according to a third embodiment of the invention.

In FIG. 3, a frequency doubled microchip laser according to a third embodiment of the invention is shown, which comprises intra-cavitary arranged functional elements in form of a Q-stwitch 5 and a polarizer 6. The polarizer 6 inhibits polarization induced noise in the cavity, which would have a detrimental effect on the generation of the frequency doubled light wave.

Figure 4:
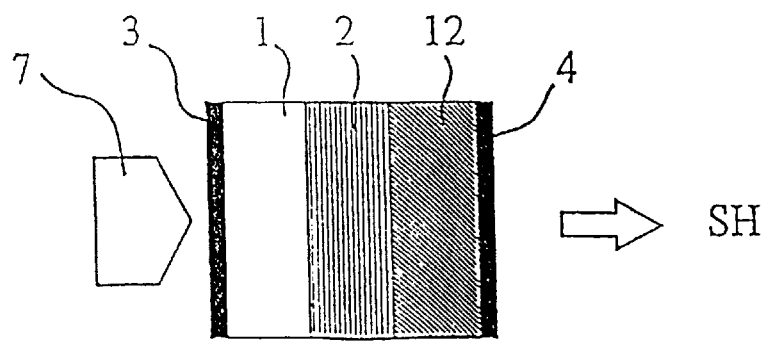
FIG. 4 schematically shows a laser according to a fourth embodiment of the invention.

In FIG. 4, a microchip laser according to a fourth embodiment of the invention is schematically shown, which, in addition to what has been described with reference to the first embodiment, also comprises an intra-cavity arranged mode discriminating element 12 which makes sure that lasing is taking place in desired modes, preferentially single-mode.

As is understood by those skilled in the art, the different functional elements may be chosen and combined according to desired application and are not restricted to the embodiments described above. The different elements may also be mounted and combined in desired ways to form a miniature laser, as will be further described with reference to FIG. 9a–9c below.

Figure 5A:
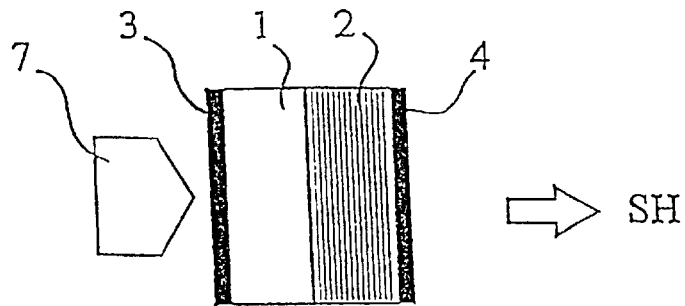
FIG. 5a schematically shows a microchip laser according to the invention; which is pumped with radiation from a laser diode.
Figure 5B:
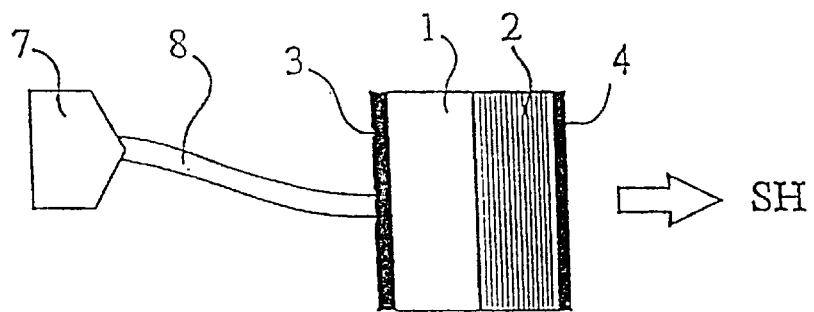
FIG. 5b schematically shows a microchip laser according to the invention, which is pumped with light from a diode laser via an optical fiber.
Figure 5C:
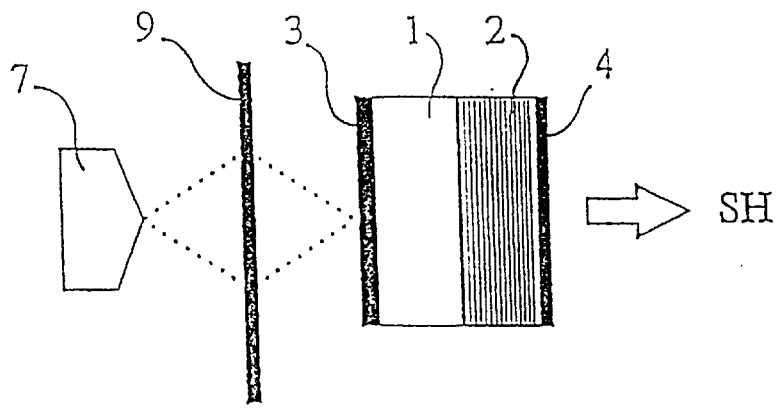
FIG. 5c schematically shows a microchip laser according to the invention, which is pumped with light from a diode laser via a holographic optical element or a similar optical element.

FIG. 5a to 5c schematically show a microchip laser of the kind described with reference to FIG. 1, in which the microchip laser is pumped with light from a laser diode 7. In FIG. 5a, the laser diode 7, like in FIG. 1, is provided in proximity to the laser element 1, whereby the radiation from the laser diode is transferred directly to the microchip laser. In FIG. 5b, the laser diode is provided at a distance from the laser microchip 1, wherein the radiation from the laser diode is transferred to the laser microchip 1 by an optical fiber 8. In FIG. 5c, the radiation from the laser diode 7 is transferred to the laser chip 1 via an optical element 9 which may be a holographic optical element, a GRIN lens or a similar optical system.

Figure 6:
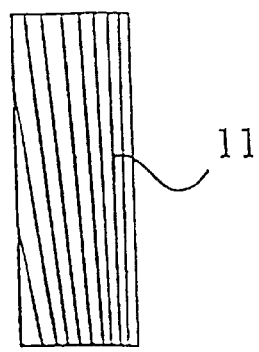
FIG. 6 schematically shows an alternative embodiment of a quasi-phase matching element comprised in a laser according to the invention.

In FIG. 6, an alternative embodiment of a quasi-phase matching element 11 is schematically shown. In the element 11, the quasi-phase matching grating is provided with a grating period varying in a direction perpendicularly to the propagation direction, i.e. the grating period and thus the quasi-phase matching wavelength is changing from the upper part of the element to the lower part in the figure. By testing, during fabrication of the laser, which part of the quasi-phase matching element 11 that gives the best conversion, i.e. which grating period that gives a phase matching best fitting to the wavelength spectrum of the laser, the microchip laser is optimized with respect to the frequency doubled output power.

As mentioned above, a crystal with several parallel grating periods may be used in the different realizations of the invention.

Figure 7:
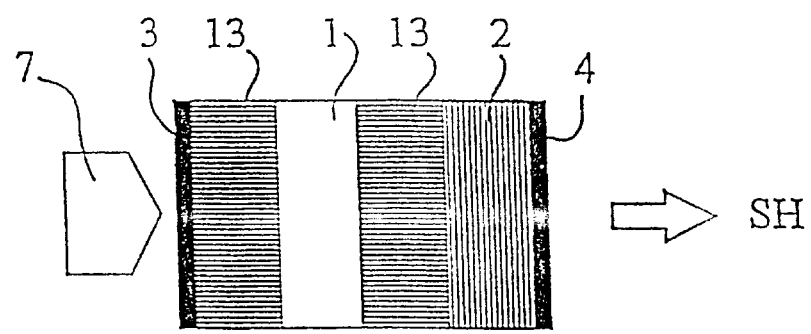
FIG. 7 schematically shows a laser according to a fifth embodiment of the invention.

A microchip laser according to a fifth embodiment of the invention is shown in FIG. 7. The laser in FIG. 7 differs from the one in FIG. 1 in that a mechanically supporting element 13 is provided on opposite sides of the laser microchip 1. This realization is particularly preferred in high power applications. When the laser microchip is pumped with high power, part of the energy transferred from the diode laser 7 to the micro-chip 1 will be lost as heat. The microchip 1 will then tend to expand, which can cause cracking of the laser micro-chip 1. The mechanically supporting elements 13 counteracts such an undesired cracking by reducing the thermal expansion of the laser microchip 1. The mechanically supporting elements 13 is preferably made of the same material as the laser microchip 1, but without doping. If the laser microchip is made of Nd:YAG, it is consequently preferred to have the mechanically supporting elements 13 made of undoped YAG.

Figure 8A:
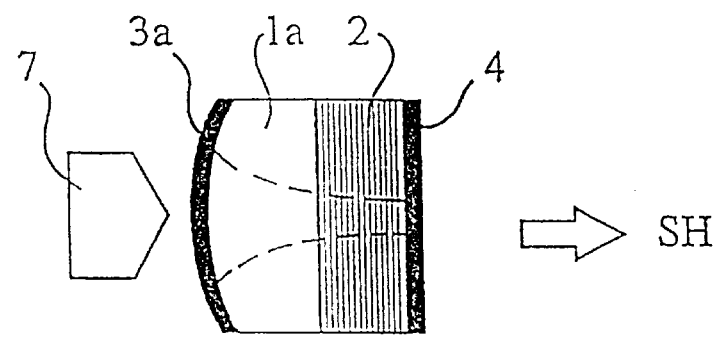
FIG. 8a schematically shows a laser according to a sixth embodiment of the invention.

In FIG. 8a, a microchip laser according to a sixth embodiment of the invention is shown. The laser in FIG. 8a is different from, for example, the one shown in FIG. 1 in that it has the side 1a opposite to the quasi-phase matching element 2 polished to a curved surface on which a curved reflecting element 3a is provided. The curved reflecting element 3a works as a converging element which both forms a stable laser cavity and achieves the highest possible light intensity in the quasi-phase matching element 2, which schematically is indicated with dashed lines in the figure. It may be noted that a completely planar parallel microchip laser of the kind shown in FIG. 1–7 only is stabilized because of the energy lost in the laser microchip 1, which leads to the necessary optical expansion and curving of the surface of the laser microchip, which provides a stable beam path through the laser. However, in FIG. 8a the stability is achieved by the incorporation of the converging element, in this case the reflector 3a.

Figure 8B:
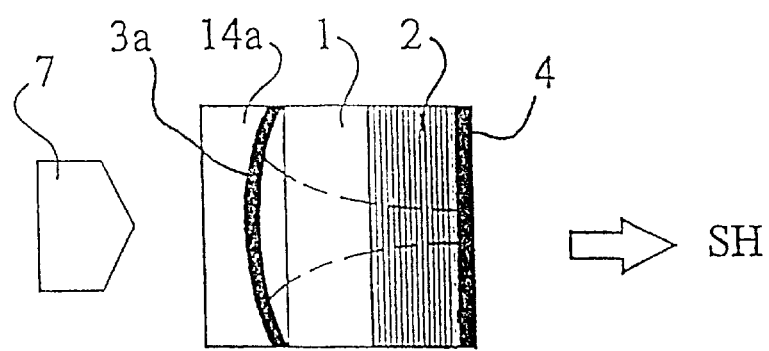
FIG. 8b schematically shows a laser according to a seventh embodiment of the invention.

In the seventh embodiment of FIG. 8b, the converging element is provided in a similar way by a reflecting element 3a, which corresponds to the curved reflecting element 3a in FIG. 8a but which in FIG. 8b instead is provided on a curved surface of a mirror substrate 14a. One side of the substrate 14a is essentially planar, while the other side of the substrate 14a, i.e. the side directed towards the laser microchip 1 and covered with the reflecting element 3a, is curved and hence only in contact with the laser microchip 1 in a peripheral portion thereof. (In an alternative embodiment, the reflecting element 3a may be completely separated from the laser microchip 1.)

The reflecting element 3a is preferentially high reflecting for the fundamental wavelength. It is at the same time preferred that the element 3a transmits light from the laser diode 7 so it easily can pass into the laser cavity. As a consequence of the curvature of the substrate 14a and the reflecting element 3a, a semi-convex air gap is formed between the reflecting element 3a and the laser chip 1. The curved surface of the reflecting element 3a will provide a stabilization of the beam path through the laser and a focusing of the light in the quasi-phase matching element, in a similar way as is described with reference to FIG. 8a and which has been indicated by the dashed lines in FIG. 8b.

Figure 9A:
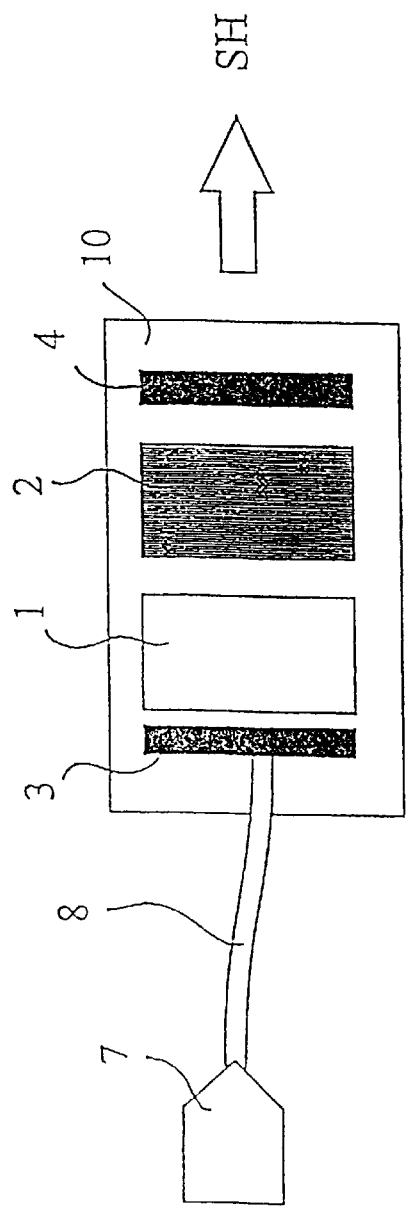
FIG. 9a schematically shows a miniature laser according to an eight embodiment of the invention.
Figure 9B:
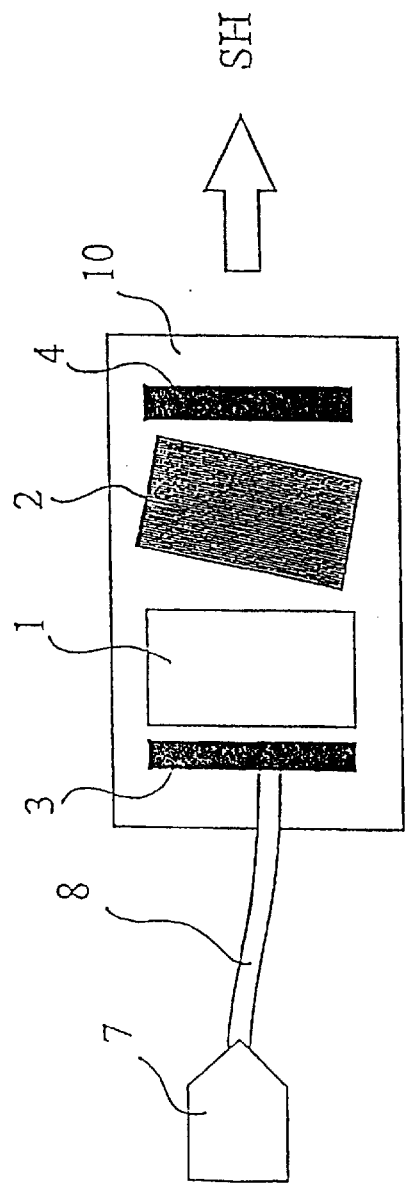
FIG. 9b schematically shows the miniature laser in FIG. 9a in an alternative arrangement.

FIG. 9a and 9b schematically show a miniature laser according to an eighth embodiment of the invention. In FIG.

9a and 9b, a first reflecting element 3, a laser microchip 1, a quasi-phase matching element 2, and a second reflecting element 4 are arranged separately from each other on a prepared micro-table or carrier 10, which may be a silicon chip, a plastic plate, an etched glass or metal plate, or the like. The laser microchip is pumped by a laser diode 7 via an optical fiber 8. Of course, as discussed above, the laser light may instead be transferred from the diode laser 7 directly to the laser micro-chip 1 without any optical fiber, or by using a lens system or the like.

As is shown in FIG. 9a and 9b, the elements are mounted separately from each other on the carriers 10. This facilities fine adjustments of the different elements to allow optimization of the function of the miniature laser. For example, the reflecting elements 3 and 4 may be chosen, and their individual positions be adjusted, to give an optimized beam path through the cavity formed by the reflecting elements 3 and 4. It is desired that the beam path is adjusted so that an optimum power density is achieved in the quasi-phase matching element 2. The carrier 10 be provided with tuning nobs, or similar tools (not shown), to trim the position of the different elements.

An advantageous aspect of such a micro-mechanical fine-tuning is that a quasi-phase matching element which only has one grating period can be rotated or tilted around the axes perpendicular to the beam path through the cavity, as shown in FIG. 9b. When the quasi-phase matching element is adjusted, the effective quasi-phase matching period experienced by the fundamental wavelength is changed. The grating period can hence be mechanically adjusted for optimum frequency doubling. The miniature laser in FIG. 9a and 9b may of course also include other elements, like a tunable mode discriminating element for choice of desired laser mode.

Figure 9C:
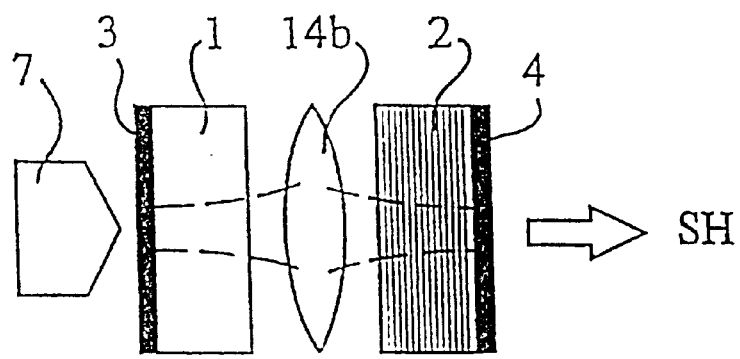
FIG. 9c schematically shows a miniature laser according to a ninth embodiment of the invention.

A miniature laser of the kind shown in FIG. 9a and 9b may also be provided with light converging elements aiming to stabilize the laser and provide an optimum light intensity in the quasi-phase matching element 2. In FIG. 9c, such a converging element, in the form of a conventional convex lens 14b, is provided between the laser chip 1 and the quasi-phase matching element 2. The lens 14b in FIG. 9c is separated from the laser chip 1 and the element 2 by air gaps. As schematically indicated with dashed lines in FIG. 9c, the lens 14a will stabilize the beam path through the laser and at the same time focus the beam in the quasi-phase matching element, in a similar way as described with reference to Fig. 5a and 8b.

Figure 9D:
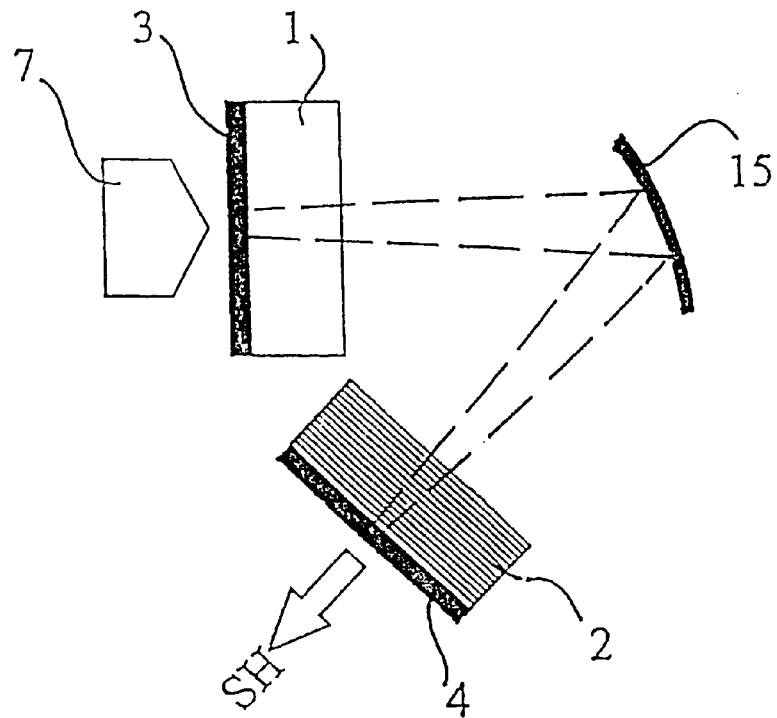
FIG. 9d schematically shows a miniature laser according to a tenth embodiment of the invention.

An alternative is shown in the embodiment in FIG. 9d, wherein a converging element is provided in form of a curved mirror 15 arranged between the laser chip 1 and the quasi-phase matching element 2. Hence, in FIG. 9d, a folded beam path through the cavity is utilized, defined by the reflecting elements 3, 4 and 15. As schematically indicated by the dashed lines in FIG. 9d, the mirror 15 will reflect and focus the light from the laser microchip 1 on the quasi-phase matching element 2 to provide both a stabilization of the beam path through the laser and a focusing of the light to a high intensity in the quasi-phase matching element, in a similar way to what has been described above.

Even though specific embodiment of the present has been described, it is understood by those skilled in the art that many different modifications, combinations and changes of the different embodiment may be provided within the scope of the invention, which is defined by the accompanying claims.

Even though the description of the present invention has been concentrated to frequency doubling, it is understood by those skilled in the art that the invention may just as well be used for other types of wavelength conversions.

What is claimed is:

1. Method for generating laser radiation, comprising the steps of:
   generating laser radiation of a fundamental wavelength from a laser microchip in a laser cavity by pumping it with radiation from a diode laser; and
   converting said laser radiation of said fundamental wavelength, by means of an intra-cavity quasi-phase matching grating provided in said laser cavity, into frequency doubled radiation having a wavelength being half as long as the fundamental wavelength.

2. Method as claimed in claim 1, further comprising the step of converging said laser radiation of the fundamental wavelength so that light intensity, with respect to said laser radiation of the fundamental wavelength, becomes as large as possible during said quasi-phase matching.

3. Method as claimed in claim 2, comprising the step of pulsing said frequency doubled laser radiation so that it is emitted in short pulses from the laser microchip.

4. Method as claimed in claim 3, comprising the step of stabilizing polarization of the laser radiation to inhibit occurrence of undesired polarization changes in the laser microchip.

5. Method as claimed in claim 2, comprising the step of stabilizing polarization of the laser radiation to inhibit occurrence of undesired polarization changes in the laser microchip.

6. Method as claimed in claim 1, further comprising the step of pulsing said frequency doubled laser radiation so that it is emitted in short pulses from the laser microchip.

7. Method as claimed in claim 6, comprising the step of stabilizing polarization of the laser radiation to inhibit occurrence of undesired polarization changes in the laser microchip.

8. Method as claimed in claim 1, comprising the step of stabilizing the polarization of the laser radiation to inhibit the occurrence of undesired polarization changes in the laser microchip.

9. A laser, comprising:
   first and second reflecting elements defining a resonant laser cavity;
   a laser microchip provided in said resonant laser cavity and arranged to be pumped by radiation from a diode laser to therein generate laser radiation of a fundamental wavelength; and
   an optical nonlinear, quasi-phase matching grating provided in the resonant laser cavity to receive said laser radiation of the fundamental wavelength from said laser microchip and to emit frequency doubled laser radiation of a wavelength which is half as long as said fundamental wavelength.

10. Laser as claimed in claim 9, wherein said quasi-phase matching grating being an optical non-linear crystal having c-axes directed essentially perpendicularly to a beam path through said quasi-phase matching grating.

11. Laser as claimed in claim 10, wherein said non-linear crystal is one of $LiNbO_3$, $LiTaO_3$, $KTiOPO_4$, $RbTiOPO_4$, $KTiOAsO_4$, $RbTiOAsO_4$, or $CsTiOAsO_4$.

12. Laser as claimed in claim 11, further comprising a light converging element provided to converge said laser radiation of a first wavelength so that light intensity, with respect to said laser radiation of the first wavelength, becomes as large as possible in said quasi-phase matching grating.

13. Laser as claimed in claim 3, further comprising a light converging element provided to converge said laser radiation of a first wavelength so that light intensity, with respect to said laser radiation of the first wavelength, becomes as large as possible in said quasi-phase matching grating.

14. Laser as claimed in claim 9, further comprising a light converging element provided to converge said laser radiation of a first wavelength so that light intensity, with respect to said laser radiation of the first wavelength, becomes as large as possible in said quasi-phase matching grating.

15. Laser as claimed in claim 14, wherein said first reflecting element have both an inward directed and curved reflecting surface, with respect to said resonant laser cavity, forming said light converging element.

16. Laser as claimed in claim 15, wherein said laser micro-chip has a curved surface on which said reflecting element, forming said light converging element, is provided.

17. Laser as claimed in claim 9, further comprising one of an active and passive pulse element provided in said resonant laser cavity.

18. Laser as claimed in claim 17, wherein said pulse element is a passive Q-switch comprising a saturable absorber preferably consisting of one of a Cr-doped crystal and a Cr-doped glass.

19. Laser as claimed in claim 9, further comprising a polarizing element provided in said laser cavity to ensure lasing in desired polarization.

20. Laser as claimed in claim 9, further comprising a mode discriminating element ensuring that the laser is only permitted to operate in desired modes.

21. Laser as claimed in claim 9, wherein all of said elements are aligned forming an essentially straight beam path through the resonant laser cavity.

22. Laser as claimed in claim 21, wherein all of said elements are arranged in contact with each other to form an internal air gap free cavity.

23. Laser as claimed in claim 22, wherein said laser microchip and said quasi-phase matching grating are bound together by thermal diffusion.

24. Laser as claimed in claim 9, wherein said first and second reflecting elements are provided on an external side of said laser microchip and said quasi-phase matching grating by vacuum deposition.

25. Laser as claimed in claim 9, wherein said laser microchip comprises a material containing a dopant forming more than 0.1 percent by weight of the material.

26. Laser as claimed in claim 25, wherein said dopant is one of neodymium and ytterbium and said material is one of YAG and $YVO_4$.

27. Laser as claimed in claim 9, wherein said laser microchip has a length in a direction of the beam which is smaller than 3 mm, preferably 1.5 mm.

28. Laser as claimed in claim 9, wherein a cross-section of said laser microchip and said quasi-phase matching grating perpendicular to a beam direction are smaller than 10 $mm^2$, preferably smaller than 5 $mm^2$.

29. Laser as claimed in claim 9, wherein said quasi-phase matching grating has a length in a beam propagation direction of less than 4 mm, preferably less than 2 mm.

30. Laser as claimed in claim 9, wherein said quasi-phase matching grating having grating period which vary in a direction perpendicular to a propagation direction.

31. Method for generating frequency doubled laser radiation, comprising the step of converting laser radiation of a fundamental wavelength into frequency doubled radiation having a wavelength being half as long as the fundamental wavelength with a quasi-phase matching grating.

* * * * *